Nov. 9, 1965 — G. W. SHERWOOD — 3,217,227
BATTERY CHARGING EQUIPMENT
Filed March 19, 1962 — 2 Sheets-Sheet 1

INVENTOR.
GEORGE W. SHERWOOD
BY Whittemore
Hulbert & Belknap
ATTORNEYS

Nov. 9, 1965

G. W. SHERWOOD 3,217,227

BATTERY CHARGING EQUIPMENT

Filed March 19, 1962

INVENTOR.
GEORGE W. SHERWOOD

BY

ATTORNEYS

United States Patent Office 3,217,227
Patented Nov. 9, 1965

3,217,227
BATTERY CHARGING EQUIPMENT
George W. Sherwood, 1347 Audubon,
Grosse Pointe Park, Mich.
Filed Mar. 19, 1962, Ser. No. 180,551
10 Claims. (Cl. 320—51)

The invention relates to battery charging equipment and refers more specifically to improved apparatus for selectively charging a plurality of batteries, such as rechargeable flashlight batteries of different size and performing a battery capacity check.

In the past equipment for charging batteries has generally been limited in function to charging a specific number of batteries of particular size. Further, prior battery charging equipment has been undesirable in that relatively poor control of the charging cycle has been accomplished with variable resistors in series with the batteries to be charged. The resistors have further often been of the type to generate a great deal of heat and have been positioned immediately adjacent the batteries being charged so that with prior battery charging equipment it has been necessary to provide a meter to indicate full charge of the batteries to prevent overheating and consequent explosion of the batteries during charging thereof.

Prior known battery charging equipment has further been deficient in that no means have been provided in conjunction therewith to indicate whether or not the equipment is actually charging a battery positioned therein. Likewise, previously available battery charging equipment has not been capable of readily providing a battery capacity check.

It is therefore an object of the present invention to provide improved charging equipment for rechargeable batteries.

Another object is to provide battery charging equipment for simultaneously charging a variable number of batteries of variable size.

Another object is to provide battery charging equipment comprising a source of uni-directional electrical energy and a plurality of parallel circuits in series therewith each including an exactly controlled electric resistance in series with a plurality of different size batteries to be charged.

Another object is to provide structure as set forth above wherein each of the series resistances comprises an electric light bulb of different predetermined resistance value which is operable to indicate charging of the batteries in series therewith.

Another object is to provide structure as set forth above wherein the batteries are supported in a multi-trough tray each trough of which is provided with a plurality of separate radiuses to support batteries of different size.

Another object is to provide structure as set forth above further including means for connecting all of the light bulbs in parallel and for connecting a single large battery in series between the light bulbs and the source of electrical energy.

Another object is to provide battery charging equipment as set forth above and further including means for effecting a capacity check of a battery.

Another object is to provide battery charging equipment which is simple in construction, economical to manufacture and efficient in use.

Other objects and features of the invention will become apparent as the description proceeds, especially when taken in conjunction with the accompanying drawings, illustrating a preferred embodiment of the invention, wherein.

Figure 1:
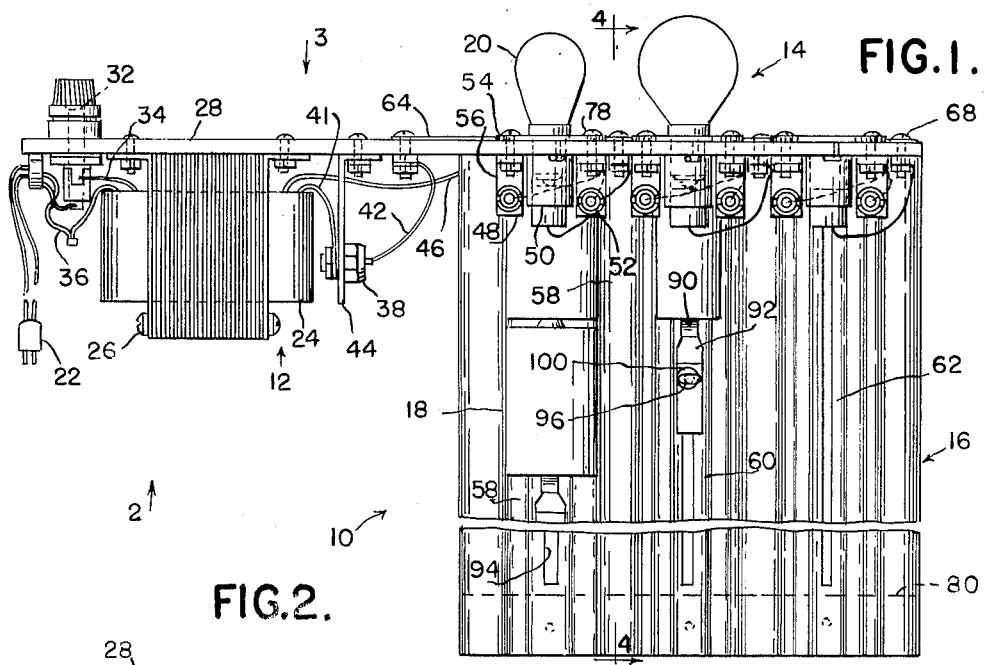
FIGURE 1 is a plan view of battery charging equipment constructed in accordance with the invention.

With particular reference to the drawings one embodiment of the invention will now be considered in detail.

The battery charging equipment 10 illustrated in FIGURES 1–4 and 7 includes a source of uni-directional electrical energy 12. A plurality of parallel circuits each comprising a plurality of selectable electrical resistance means 14 including separate light bulbs 20 for connecting a plurality of batteries 18 in series therewith which parallel circuits are connected in series between a tray 16 for supporting the batteries and the source of electrical energy are also included as part of the battery charging equipment 10.

In operation the batteries 18 to be charged are positioned in the tray 16. As shown in FIGURE 1 light bulbs 20 of predetermined electrical resistance suitable for the charging of the particular batteries 18 are placed in series with the individual series of batteries 18. The source of uni-directional electrical energy 12 is connected to the usual alternating current electrical energy source by convenient means such as plug 22. Electrical energy will then flow in series through the source of uni-directional electrical energy 12, the parallel circuits each comprising a selected light bulb 20 and batteries 18 in series and back to the energy source 12 through tray 16 whereby the batteries 18 will be charged.

Figure 2:
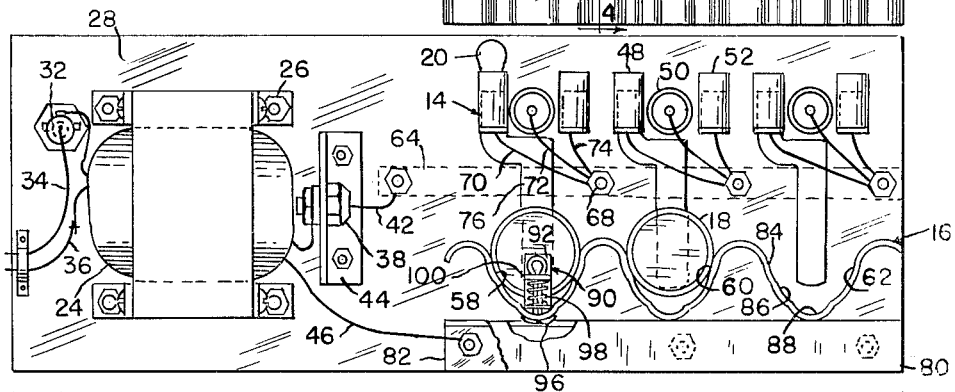
FIGURE 2 is a view of the battery charging equipment illustrated in FIGURE 1 taken in the direction of arrow 2 in FIGURE 1.
Figure 3:
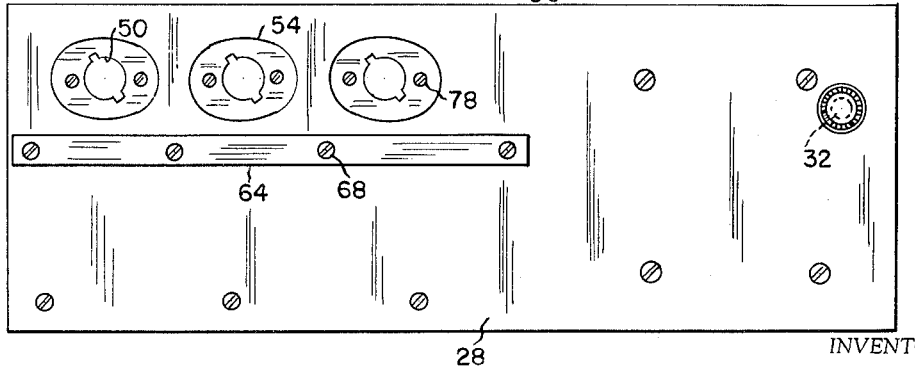
FIGURE 3 is a view of the battery charging equipment illustrated in FIGURE 1 taken in the direction of arrow 3 in FIGURE 1.

More specifically the means for providing a source of uni-directional electrical energy as shown best in FIGURES 1 and 2 comprises a transformer 24 supported by means of brackets 26 on the mounting panel 28. Mounting panel 28 is constructed of insulating material. A primary winding 30 of the transformer 24 is connected through the fuse 32 to the plug 22 by electrical conductors 34 and 36.

The source of uni-directional electrical energy 12 further includes the rectifying crystal 38 connected in series with the secondary winding 40 of the transformer 24 by the electrical conductor 41. The rectifying crystal 38 is mounted on a metal bracket 44 which is in turn secured to the mounting panel 28. The bracket 44 provides a heat sink for the crystal 38 to dissipate the heat generated therein.

In accordance with the usual operation of such transformer and rectifier circuits the plug 22 is connected to the usual one hundred fifteen volt sixty cycle alternating electrical energy source whereby the transformer 24 is energized. The rectifier 38 rectifies the alternating electrical energy in the secondary winding 40 of the transformer 24 to provide a source of uni-directional electrical energy for the battery charging equipment 10. An electric circuit is completed through the secondary winding 40 of the transformer 24 over the conductor 46 which is secured to the electrically conducting tray 16 as will become more evident subsequently.

Each resistance means 14 as shown in FIGURE 1 includes three light bulb sockets 48, 50 and 52, secured by means of the electrically conducting mounting flange 54 and brackets 56 to the mounting panel 28. A separate resistance means 14 is provided in conjunction with each of the separate troughs 58, 60 and 62 of the tray 16.

With a light bulb having a known resistance in any of the sockets 48, 50 or 52 an electrical circuit is completed through the particular resistance means 14 from the bus bar 64 secured to the mounting panel 28 by means of bolts 68 and connected to the secondary winding 40 of the transformer 24 through the conductor 42, through the bolt 68 associated with each of the resistance means 14, the conductors 70, 72 or 74 connected between the bolt 68 and whichever of the sockets 48, 50 or 52 the light bulb is in, through the light bulb and to the terminal strip 76 associated therewith through the brackets 56, bolts 78 and mounting flange 54 which are electrically connected together.

Thus it will be seen that in operation by placing light bulbs having different predetermined electrical resistance values in the sockets 48, 50 and 52 and varying the combination of the light bulbs that a plurality of different predetermined resistances may be placed in series between the source of uni-directional electrical energy 12 and the separate parallel rows of batteries 18 to be charged. Thus the current which is passed through the batteries 18 in any particular row of batteries in series may be varied in accordance with the size and number of batteries in a row to provide optimum charging of the batteries in each trough of tray 16.

The tray 16 as shown best in FIGURES 1 and 2 is corrugated to provide the separate troughs 58, 60 and 62 for supporting separate rows of batteries to be charged in series. The tray 16 is constructed of electrically conductive material and is supported at opposite ends thereof by the angle members 80 and 82. Angle member 82 is in turn secured to the mounting panel 28.

So that batteries of different diameter, such as those for pen lights and flashlights may be charged with the same battery charging equipment 10, the troughs 58, 60 and 62 of the tray 16 are provided with a plurality of separate radiuses as illustrated at 84, 86 and 88 in FIGURE 2. The electrical circuit through the batteries 18 mounted in a trough in tray 16 is from the terminal strips 76 associated with the particular trough through the batteries 18 in series, and the sliding contact 90 positioned in each of the troughs 58, 60 and 62 to the tray 16.

Figure 4:
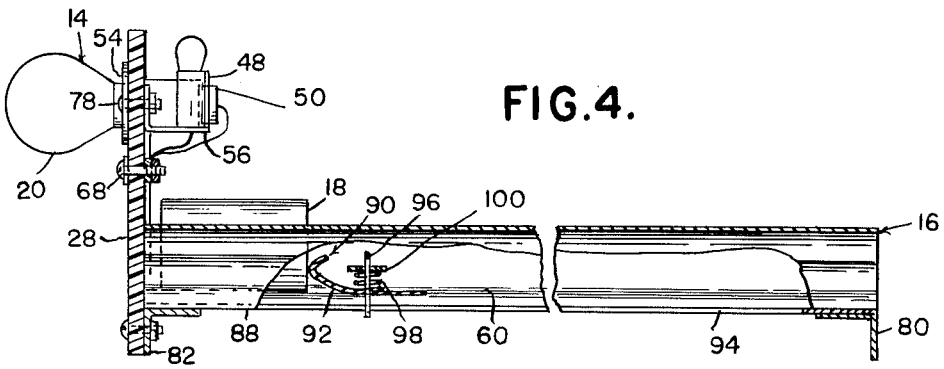
FIGURE 4 is a section view of the battery charging equipment illustrated in FIGURE 1 taken substantially on the line 4—4 in FIGURE 1.

The sliding contacts 90 each comprise a flexible contact finger 92 formed as shown best in FIGURE 4 to make electrical contact with one terminal of a battery 18 positioned in a trough on the tray 16 regardless of the diameter of the battery within the limits defined by the indicated three separate trough radiuses. The contact finger 92 is supported for movement longitudinally of the trough in which it is positioned in a slot 94 provided therefor in the trough. A cotter pin 96 formed as shown best in FIGURE 2 and resiliently held in position within a slot 94 by a spring 98 acting between a washer 100 and a contact finger 92 to secure the contact finger in a trough is also part of each of the sliding contacts 90.

In operation a plurality of batteries of different sizes are placed in the troughs 58, 60 and 62 as shown in FIGURE 1. It will be noted that the batteries for each trough are preferably but not necessarily of the same size and any of the troughs may be empty.

The sliding contacts 90 in each trough is then moved toward the mounting panel 28 as far as possible by depressing the cotter pin 96 in opposition to the bias of spring 98 and sliding the contact finger 92 along the particular trough in which it is positioned to make a firm electrical connection between one terminal of the battery in the trough nearest the mounting panel and the terminal strip 76 associated with the particular trough, between the opposite terminals of adjacent batteries in series in the trough and between the other terminal of the battery in the series closest the sliding contacts 90.

Light bulbs are then selected for placing in each of the sets of sockets 48, 50 and 52 associated with the separate troughs 58, 60 and 62 to provide a predetermined resistance in series with the batteries in the separate troughs to provide optimum charging of all of the batteries 18 on connecting the plug 22 to the usual source of alternating electrical energy. The plug 22 is then connected to a source of alternating electrical energy (not shown) whereby uni-directional electrical energy is supplied to the batteries 18 through the selected bulbs of each resistance means 14. After a predetermined time the batteries 18 will be charged.

Charging of the batteries 18 is indicated by the brilliance of the selected light bulbs 20 since the bulbs 20 burn perceptively brighter at the start of a charging operation than at the end thereof due to the low internal resistance to flow of electrical current through discharged batteries. Thus the electric light bulbs not only provide easily controlled means for producing the exact amount of resistance necessary to provide optimum charging of the batteries 18 but also provide a visual indication of whether or not the batteries 18 are actually being charged.

Further it will be noted that the battery charging equipment 10 is constructed to provide maximum ventilation of the batteries 18 and that the bulbs 20 are separated therefrom. Thus there is no danger with the battery charging equipment of the invention of the resistance components thereof heating the batteries 18 to the point where they explode.

Figure 5:
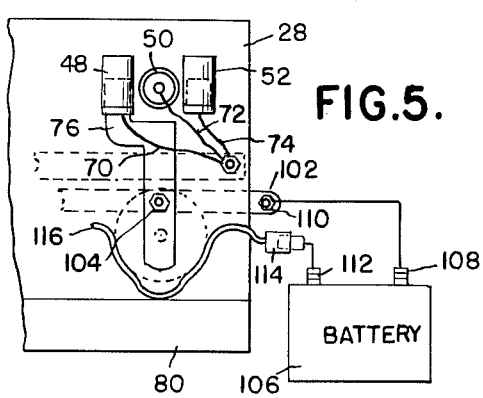
FIGURE 5 is a fragmentary view similar to FIGURE 2 of a modification of the battery charging equipment illustrated in FIGURES 1–4.

The modification of the invention illustrated in Figure 5 includes an additional bus bar 102 secured to the mounting panel 28 by means of the bolts 104 which make electrical connection with each of the terminal strips 76. The bus bar 102 is removable and is installed only when it is desired to charge a battery 106 which either cannot fit in the tray 16 or is of such capacity that more current is necessary to charge the battery in a reasonable length of time than is available through the bulbs 20 in a single resistance means 14.

As shown in FIGURE 5 with the bus bar 102 installed on the mounting panel 28 one terminal 108 of the battery 106 is connected to the end 110 of the bus bar 102 and the other terminal 112 is connected to the tray 16 by convenient means 114. The charging circuit then is through the transformer 24, rectifier 38, bus bar 64, as many of the light bulbs 20 in as many of the resistance means 14 as necessary, through the terminal strips 76, to the bus bar 102, through the battery to the tray 116 and back to the transformer.

Thus it will be seen that batteries of extremely high capacity and varied shape may be charged with the battery charging equipment illustrated in FIGURE 5.

Figure 6:
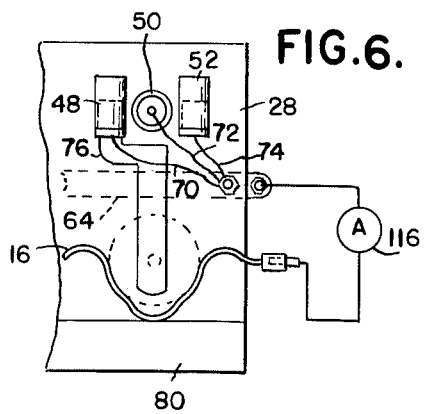
FIGURE 6 is a fragmentary view similar to FIGURE 2 of a second modification of the battery charging equipment illustrated in FIGURE 2.
Figure 7:
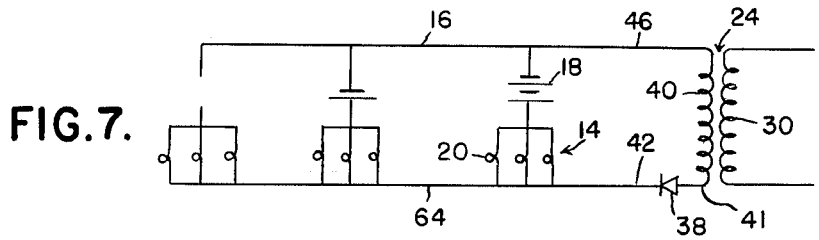
FIGURE 7 is a schematic diagram of the circuit of the battery charger illustrated in FIGURES 1–4.

In the modification of the battery charging equipment illustrated in FIGURE 6 an ammeter 116 is connected between the bus bar 64 and the tray 16. Thus a battery positioned in a trough of the tray 16 may be discharged through the ammeter 116 and an appropriate light bulb 20 whereby a capacity check of the battery may be effected on observing the time necessary to discharge a battery through the ammeter.

While one embodiment of the invention and modifications thereof have been disclosed in detail, it will be understood that other modifications and embodiments of the invention are contemplated. It is therefore the intention to include within the invention all such embodiments and modifications as are defined by the appended claims.

What I claim as my invention is:

1. Battery charging equipment comprising a transformer including primary and secondary coils, means for connecting the primary coil of the transformer to a source of alternating electrical energy, a rectifier, means connecting one end of the secondary winding of the transformer to one terminal of the rectifier, a bus bar, means for connecting the other terminal of the rectifier to the bus bar, a plurality of sets of light bulb sockets, means connecting the bus bar to one terminal of each of the light bulb sockets in each of the plurality of sets of light bulb sockets, a separate terminal strip associated with each of the plurality of sets of light bulb sockets, means for connecting the other terminal of each of the light bulb sockets in a set of light bulb sockets to the terminal strip associated with the particular set of light bulb sockets, a tray of conductive material, means for supporting a plurality of batteries on said tray with one terminal thereof in contact with one of the terminal strips and with the other terminal thereof in contact with the tray and means connecting the tray to the other end of the secondary coil of the transformer.

2. Battery charging equipment comprising an insulating panel, a transformer including primary and secondary coils secured to the insulating panel, means for connecting the primary coil of the transformer to a source of alternating electrical energy, a rectifier, means supporting the rectifier from the insulating panel, means connecting one end of the secondary winding of the transformer to one terminal of the rectifier, a bus bar secured to the insulating panel, means for connecting the other terminal of the rectifier to the bus bar, a plurality of sets of light bulb sockets secured to the insulating panel, means connecting the bus bar to one terminal of each of the light bulb sockets in each of the plurality of sets of light bulb sockets, a separate terminal strip secured to the insulating panel associated with each of the plurality of sets of light bulb sockets, means for connecting the other terminal of each of the light bulb sockets in a set of light bulb sockets to the terminal strip associated with the particular set of light bulb sockets, a tray of conductive material secured to the insulating panel having a trough associated with each of the terminal strips, means for supporting a plurality of batteries in the troughs with one terminal of the batteries in contact with one of said terminal strips and with the other terminal of the batteries in contact with the tray and means connecting the tray to the other end of the secondary coil of the transformer.

3. Battery charging equipment comprising an insulating panel, a transformer including primary and secondary coils secured to the insulating panel, means for connecting the primary coil of the transformer to a source of alternating electrical energy, a rectifier, heat conducting means supporting the rectifier from the insulating panel, means connecting one end of the secondary winding of the transformer to one terminal of the rectifier, a bus bar secured to the insulating panel, means for connecting the other terminal of the rectifier to the bus bar, a plurality of sets of light bulb sockets secured to the insulating panel, means connecting the bus bar to one terminal of each of the light bulb sockets in each of the plurality of sets of light bulb sockets, a separate terminal strip secured to the insulating panel associated with each of the plurality of sets of light bulb sockets, means for connecting the other terminal of each of the light bulb sockets in a set of light bulb sockets to the terminal strip associated with the particular set of light bulb sockets, a tray of conductive material secured to the insulating panel having a trough associated with each of the terminal strips, each trough including a plurality of separate diameters for supporting batteries of separate diameter with one terminal thereof in contact with one of said terminal strips, each of said troughs having a slot therein, a sliding contact movable longitudinally of each of said troughs for engagement with the other terminal of a battery positioned therein and means connecting the tray to the other end of the secondary coil of the transformer.

4. Battery charging equipment comprising a uni-directional source of electrical energy secured to an insulating panel, a bus bar connected to the source of uni-directional electrical energy, a plurality of terminal strips secured to the insulating panel and a plurality of sets of parallel connected light bulb sockets completing separate series circuits between the bus bar and each of the terminal strips, a tray of conductive material having a trough associated with each of the terminal strips for supporting a plurality of batteries in series including a separate sliding contact movable longitudinally of each of the plurality of troughs whereby a variable number of batteries may be positioned in each trough for charging and means for connecting the tray to the source of uni-directional energy.

5. Structure as set forth in claim 4 and further including a second bus bar connected to each of the terminal strips and means for connecting a battery between the second bus bar and the tray whereby batteries having a capacity too great to be charged in any single trough may be charged by the battery charging equipment.

6. Structure as set forth in claim 4 wherein the battery charging equipment further includes an ammeter connected between the bus bar and the tray.

7. Structure as set forth in claim 4 wherein each of said troughs is provided with a cross section having a plurality of separate radiuses whereby batteries of different size may be accommodated in the same trough.

8. Structure as set forth in claim 7 wherein each of the troughs in the tray are provided with a longitudinally extending slot therein and the separate sliding contacts comprise a cotter pin having a head and a pair of free ends which free ends extend through the slot associated with the particular trough in which the sliding contact is positioned and diverge from each other for preventing withdrawal of the pin from the slot in one direction, a washer carried by said cotter pin adjacent the head thereof, a resilient contact finger secured to the cotter pin between the washer and trough and resilient means acting between the washer and contact member for urging the washer and contact member in opposite directions.

9. Structure as set forth in claim 8 wherein the radiuses of each trough are related so that the circles defined by each of the radiuses are mutually overlapping and the contact finger of the sliding contact associated with the trough is constructed to electrically contact batteries positioned in the trough within the overlapping area of the circles defined by the trough radiuses.

10. Structure as set forth in claim 4 wherein the source of uni-directional energy comprises a source of alternating energy, a transformer primary coil connected in series with the source of uni-directional energy and a fuse, a transformer secondary coil operatively associated with the transformer primary coil and a rectifier secured to a heat dissipating bracket connected in series with the transformer secondary coil.

References Cited by the Examiner

UNITED STATES PATENTS

| | | | |
|---|---|---|---|
| 578,823 | 3/97 | Kitsee | 320—51 X |
| 1,433,455 | 10/22 | Horton | 317—99 |
| 2,418,141 | 4/47 | Salazar | 320—51 X |
| 2,424,059 | 7/47 | Scott | 320—51 |
| 2,611,118 | 9/52 | Havlick | 320—51 X |

LLOYD McCOLLUM, *Primary Examiner.*